United States Patent [19] [11] 4,154,711

Gandurin et al. [45] May 15, 1979

[54] COMPOSITION FOR PRINTING ON FABRICS

[76] Inventors: Lev I. Gandurin, Kamchatskaya ulitsa, 6, korpus 2, kv. 97; Margarita A. Didenko, proezd Shokalskogo, 65, korpus 1, kv. 81; Svetlana N. Vedeneeva, Presnensky val, 16, kv. 53, all of, Moscow; Ekaterina M. Lukina, ulitsa Lenina, 65, kv. 53, Dzerzhinsk Gorkovskoi oblasti, all of U.S.S.R.

[21] Appl. No.: 731,741

[22] Filed: Oct. 12, 1976

[30] Foreign Application Priority Data

Oct. 20, 1975 [SU] U.S.S.R. .............................. 2182370

[51] Int. Cl.[2] ............................................ C08L 33/04

[52] U.S. Cl. ................................ 260/29.6 WB; 8/62; 8/115.6; 252/8.8; 260/29.6 N; 260/29.6 HN; 260/29.6 NR; 260/29.1 SB; 260/29.4 UA

[58] Field of Search ................. 260/29.6 N, 29.6 HN, 260/29.6 WB, 29.4 UA, 29.6 NR, 29.1 SB; 8/62, 115.6; 252/8.8 A, 8.8 AM, 8.8 AP

[56] References Cited

U.S. PATENT DOCUMENTS 3,249,454 5/1966 Williams ........................ 260/29.6 N
3,366,588 1/1968 Booth .......................... 260/29.6 WB
3,477,975 11/1969 Concannon ................. 260/29.6 WB
3,650,664 3/1972 De Graff et al. .......................... 8/62
3,978,016 8/1976 Perronin et al. .......................... 8/62

FOREIGN PATENT DOCUMENTS 588164 12/1959 Canada ......................................... 8/62
1376041 9/1964 France ........................... 260/29.6 WB
2003889 3/1969 France.
4324226 8/1962 Japan ............................................ 8/62

*Primary Examiner*—Melvyn I. Marquis
*Attorney, Agent, or Firm*—Lackenbach, Lilling & Siegel

[57] ABSTRACT

A composition for printing on fabrics of natural and synthetic fibers containing a pigment, an acrylic film-forming agent, a softener comprising a mixture of unsaturated primary aliphatic amines ($C_3$–$C_6$) and hydrosiloxane, and a synthetic acrylic thickener in the form of a copolymer of alkyl acrylate ($C_2$–$C_8$) and α-unsaturated acid containing from 0.5 to 1.0% by weight of ethylene glycol dimethacrylate neutralized with a primary or secondary aliphatic amine, and water, the components being used in the following proportions (in % by weight):

| | |
|---|---|
| pigment dye | 1.0–8.0 |
| acrylic film-forming agent | 10–25 |
| synthetic acrylic thickener | 1.0–2.0 |
| mixture of unsaturated aliphatic amine ($C_3$–$C_6$) and hydrosilixane | 1.0–2.0 |
| water | 87–63. |

The composition for printing on natural and synthetic fabrics according to the invention may be used in the textile industry for applying patterns to fabrics.

2 Claims, No Drawings

COMPOSITION FOR PRINTING ON FABRICS

The invention relates to the textile industry, and in particular to a composition for printing on fabrics of natural and synthetic fibers using pigments.

Compositions for printing on fabrics of natural and synthetic fibers and their mixtures are used in the textile industry for applying patterns to fabrics.

The majority of inventions related to printing compositions using pigments teach the application of binders comprising various copolymers of alkyl acrylates (alkyl methacrylates) and butadiene, acrylonitrile, N-methylol derivatives of acrylamide and the like.

Generally dispersions of polymers are used which form a reticulate structure within a film of pigment. Thus, it is recommended to use a binder comprising a dispersion of copolymer of butyl acrylate, styrene, N-methylol metacrylamide and acrylic acid; the use of a dispersion of copolymer of butyl acrylate, methyl methacrylate, styrene and acrylamide.

Printing compositions for pigment printing on fabrics include binders comprising dispersions of active carboxylated elastomers containing 1-20% by weight of unsaturated acid (acrylic, methacrylic, itaconic acid). For instance, compositions of binders containing the following monomers:

| | | |
|---|---|---|
| 1. | 2-ethylhexyl acrylate | 78 g |
| | acrylonitrile | 20 g |
| | itaconic acid | 2 g; |
| 2. | butadiene | 52.5 g |
| | acrylonitrile | 42.5 g |
| | methacrylic acid | 5.0 g. |

Another known binder comprises a copolymer of ethyl acrylate, methyl methacrylate, N-(hydroxymethyl) acrylamide or (hydroxymethyl) methacrylamide and a compound of the general formula $$CH_2{=}CRCONHCH_2OR' \left( \begin{matrix} R{=}H \text{ or } Me \\ R'{=}Me \text{ or } Bu \end{matrix} \right),$$

wherein Me is methyl alcohol and Bu is butyl alcohol.

In order to provide for a highly developed reticulate structure within the pigment film, the majority of patented solutions use combinations of several copolymer binders containing different active fuctional groups. Thus, in French Patent No. 2003889 three different products are used:

I—butylene diacrylate

II—copolymer of methylene dimethacrylamine (or allyl adipate), butadiene, acrylonitrile, styrene and N-hydroxymethyl methacrylamide;

III—copolymer of butadiene, styrene, copolymer II; or butyl acrylate, acrylonitrile, vinyl chloride and copolymer II, or butadiene, acrylonitrile and copolymer II.

An essential disadvantage of these complex compositions resides in their instability with time and instability against temperature effects, so that their rheological and printing properties may largely vary. In addition, in order to improve the resistance of printed fabrics to wet rubbing and washing with attrition, it is recommended to add to a composition substances forming additional cross-links in the pigment film.

A major part of known compositions uses these substances in the form of polyfunctional compounds such as alkylene imines or methoxymethyl melamines.

Thus, it is known to use a cross-linking substance, viz., hexamethylol melamine hexamethylate. However, these substances added to a printing composition may result in a considerably deterioration of fabric handle.

One of the known methods for printing on fabrics has been developed by the BASF Company (Germany). Compositions for printing on fabrics, which do not contain benzene, comprise the following components:

| | |
|---|---|
| Lutexal TX 4223 | 20–25 g |
| $NH_4OH$ (25 wt. %) | 8 g |
| Luprintol TX 4224 | 20–30 g |
| Luprimol TX 4220 | 50 g |
| Helizarin binder | 80–100 g |
| or UD | 15 g |
| or NTA | |
| Urea | 15 g |
| Helizarin fixative | 5–10 g |
| Diammonium phosphate 2.5 wt. % | 5 g |
| Water | to 1000 g. |

BASF Company recommends to use as binders for printing compositions helizarin binders of the following grades: UD, NTA and TS. These binders are aqueous dispersions of copolymers on the basis of acrylates (UD and NTA) or butadiene (TS) capable of independently forming a copolymer reticulate structure. All the above-mentioned binders exhibit different properties: helizaring—TS binder—provides for a soft handle of printed fabrics, but the pigment film is of a limited stability against aging. Helizaring binders on the basis of acrylates (UD and NTA) are very stable against aging, but the handle of printed fabrics is more stiff than with the use of helizaring binder TS.

Lutexal TX 4223 is synthetic acrylic thickener comprising a polyelectrolyte which considerably improves the structural viscosity of solutions in the dissociated state after forming salts with alkalis. It is recommended to use this product instead of "oil-in-water" emulsions.

Luprimol TX 4220 is a substance imparting soft handle to printed fabrics.

Luprintol TX 4224 is an additive improving rheological properties of printing compositions.

Helizarin fixative is a partially etherified product of initial condensation of melamine formaldehyde. This product is used to improve the attrition resistance of fabric when printing on synthetic fabrics.

A disadvantage of this composition resides in its adverse effect on the gluing capacity of a glue (including the permanent glue Kivotex) which is used for gluing fabrics to the web in photofilm printing machines; in addition, the thickener Lutexal TX 4223 used in the printing compositions manufactured by BASF Company requires an additive —$NH_4OH$—for thickening, which makes the process of preparing printing compositions more complicated and longer. The use of $NH_4OH$ in printing compositions results in unpleasant sensations during both preparation and application due to the smell of ammonia.

It is an object of the invention to eliminate the above disadvantages.

It is a specific object of the invention to provide a composition for printing on fabrics from natural and synthetic fibers, which exhibits improved rheological and printing properties and can be prepared using simple techniques.

In accordance with said and other objects, the invention consists in the provision of a composition for printing on fabrics of natural and synthetic fibers, containing a pigment, an acrylic film-forming agent, a synthetic acrylic thickener, a softener and water, wherein, according to the invention, the softener comprises a mixture of unsaturated primary aliphatic amines ($C_3$–$C_6$) and hydrosiloxane, and the synthetic acrylic thickener comprises a copolymer of alkyl acrylate ($C_2$–$C_8$) and $\beta$-unsaturated acid containing from 0.1 to 1.0% by weight of ethylene glycol dimethylacrylate neutralized with a primary or secondary aliphatic amine, the components being used in the following proportions (in % by weight):

| | |
|---|---|
| pigment dye | 1.0–8.0 |
| acrylic film-forming agent | 10.0–25.0 |
| synthetic acrylic thickener | 1.0–2.0 |
| mixture of unsaturated aliphatic amine ($C_3$—$C_6$) and hydrosiloxane | 1.0–2.0 |
| water | 87–63. |

The composition preferably comprises the softener in the form of a mixture of unsaturated primary aliphatic amine and hydrosiloxane in a weight ratio of from 5:1 to 1:1, respectively, and the composition also preferably contains glycerin in an amount of 1 to 2% by weight.

The composition according to the invention is preferably prepared in the following manner.

870–630 l of cold water are poured into a vessel and then 15 kg of a thickener in granular form are poured in water under stirring. The thickener comprises a synthetic thickener swollen in water, which is a copolymer of alkyl acrylate ($C_2$–$C_8$) and $\beta$-unsaturated acid (acrylic, methacrylic, itaconic acid) containing 0.5–1.0% by weight of ethylene glycol dimethacrylate neutralized with a primary or secondary aliphatic amine to impart the capability of swelling in cold water, without adding alkaline agents, within 15–20 minutes.

A 40–50% dispersion of an acrylic film-forming agent is added to the thickener solution in an amount of 100–250 kg in the form of a copolymer of butyl acrylate, styrene, N-methylol methacrylamide and methacrylic acid. Then a mixture of unsaturated primary aliphatic amine ($C_3$–$C_6$) and hydrosiloxane in an amount of 10–20 kg is added to the resultant system.

The addition of the mixture of amine and hydrosiloxane enables the elimination of methylol melamine resin from the printing composition, which contributes to a finer handle of fabrics. Furthermore, the use of the above-mentioned additives in the printing compositions improves the attrition resistance of printed fabrics and brightness of the finished product.

The composition contains 10–80 kg of a pigment. The finished printing composition is thoroughly stirred. The resultant composition is used for printing on fabrics of natural and synthetic fibers in printing machines in accordance with conventional techniques. The printed fabric is dried at 90°–100° C. and heat-treated at 150°–170° C. for 3–5 minutes.

During the heat treatment, primary amine in the composition of the pigment film is capable of reacting with active $CH_2OH$—and COOH—groups of the binder macromolecules. In order to improve the rheological properties, glycerin is added in an amount of 2% by weight. Where a fabric with a softer handle is required, stearox-6-polyglycol ester of stearic acid is preferably added to the composition. The resultant composition is stable during storage for seven days. Viscosity of the printing compositions under shear is 1.5 $S^{-1}$ and corresponds to 85–150 poises (as measured on Rheotest-2instrument).

The comparison of the compositions disclosed in prior patents with the composition according to the invention shows that the latter has the advantages consisting in that the addition of a mixture of amine and hydrosiloxane functions both as a pigment film plasticizer, a cross-linking agent and a substance improving the brightness of color.

Lutexal TX 4223 thickener used in the printing compositions manufactured by BASF Company requires the use of $NH_4OH$ for thickening, which makes the process of preparing printing compositions more complicated and longer. The use of $NH_4OH$ in the printing compositions results in unpleasant sensations during both preparation and application due to the ammonia smell. The thickener used in the composition according to the invention comprises a white granular product which is capable of swelling in cold water without adding alkaline agents.

Unlike the BASF composition, the preparation of the printing compositions according to the invention does not require the employment of high-speed stirrers.

The use of the composition according to the invention enables an improvement in productivity and simplifies the process for the preparation of printing compositions. In addition, the printing composition according to the invention, in contrast to the printing compositions manufactured by BASF Company, has no adverse effect on the gluing capacity of a glue, including the permanent glue Kivotex used for gluing a fabric to the web of photofilm printing machines.

The invention will be better understood from the following examples illustrating specific embodiments thereof.

EXAMPLE 1

47 l of cold water were poured into a tank and then 1 kg of a grannular thickener comprising a copolymer of ethyl acrylate and acrylic acid cross-linked with 0.8% by weight of ethylene glycol dimethyacrylate and neutralized with diethyl amine during the synthesis was gradually added under continuous stirring. After a viscous homogeneous mass had been obtained, 40 l of cold water were added together with 10 kg of a 50% dispersion of a copolymer of butyl acrylate, styrene, N-methylol methacrylamide and methacrylic acid taken in a ratio of 78:14:4.5:5.5. After stirring, 1 kg of a mixture of allyl amine and hydrosiloxane used in a ratio of 5:1 and 1 kg of phthalocyanine green pigment were added. The finished printing composition was thoroughly stirred and used for printing on fabrics of natural and synthetic fibers on printing machines using conventional techniques. The printed fabrics were dried at 90°–110° C. and heat-treated at 150°–170° C. for 3–5 minutes.

EXAMPLE 2

40 l of cold water were poured into a tank, and 1.5 kg of a granular thickener comprising a copolymer of butyl acrylate and methacrylic acid cross-linked with 0.8% by weight of ethylene glycol dimethacrylate and neutralized with diethyl amine during the synthesis were gradually added under continuous stirring. After a viscous homogeneous mass had been obtained, 35 kg of cold water were added together with 18 kg of a 50% dispersion of a copolymer of butyl acrylate, styrene, N-methylol methacrylamide and methacrylic acid used in a ratio of 78:14:4.5:5.5. After stirring, 1.5 kg of a mixture of allyl amine and hydrosiloxane used in a ratio of 3:1 and 4 kg of purple pigment were added to the resultant system.

The finished printing composition was thoroughly stirred and used for printing on fabrics of natural and synthetic fibers on printing machines using conventional techniques. Printed fabrics were dried at 90°-110° C. and heat treated at 150°-170° C. for 3-5 minutes.

EXAMPLE 3

33 l of cold water were poured into a tank and then 2 kg of a granular thickener comprising a copolymer of butyl acrylate and methyacrylic acid cross-linked with 0.8% by weight of ethylene glycol dimethyacrylate and neutralized with diethyl amine during the synthesis were gradually added under continuous stirring. After a viscous homogeneous mass had been obtained, 30 l of cold water were added together with 25 kg of a dispersion of a copolymer of butyl acrylate, styrene, N-methylol methyacrylamide and methacrylic acid used in a ratio of 78:14:4.5:5.5. After stirring, 2 kg of a mixture of allyl amine and hydrosiloxane in a ratio of 1:1 were added to the system together with 8 kg of phthalocyanine green pigment. The finished printing compositions was thoroughly stirred and used for printing on fabrics of natural and synthetic fibers on printing machines using conventional techniques. Printed fabrics were dried at 90°-110° C. and heat-treated at 150°-170° C. for 3-5 minutes.

EXAMPLE 4

40 l of cold water were poured into a tank, and then 1.5 kg of a granular thickener comprising a copolymer of 2-ethyl-hexyl acrylate and methacrylic acid cross-linked with 0.8% by weight of ethylene glycol dimethyacrylate and neutralized with diethyl amine during the synthesis were gradually added under continuous stirring. After a viscous homogeneous mass had been obtained, 35 l of cold water were added together with 18 kg of a 50% dispersion of a copolymer of butyl acrylate, styrene, N-methylol methacrylamide and methacrylic acid in a ration of 78:14:4.5:5.5. After stirring, 1.5 kg of a mixture of allyl amine and ethylhydrosiloxane in a ratio of 3:1 and 4 kg of a light-fast yellow pigment were added to the system. The finished printing composition was thoroughly stirred and used for printing on fabrics of natural and synthetic fibers on printing machines using conventional techniques. Printed fabrics were dried at 90°-110° C. and heat-treated at 150°-170° C. for 3-5 minutes.

EXAMPLE 5

40 l of cold water were poured into a tank, and then 1.5 kg of a granular, thickener comprising a copolymer of butyl acrylate and methacrylic acid cross-linked with 0.8% by weight of ethylene glycol dimethacrylate and neutralized with diethyl amine during the synthesis were gradually added under continuous stirring. After a viscous homogeneous mass had been obtained, 35 l of cold water were added together with 18 kg of a 50% dispersion of copolymer of butyl acrylate, styrene, N-methylol methacrylamide and methacrylic acid in a ratio of 78:14:4.5:5.5. After stirring, 1.5 kg of a mixture of 1-aminopentene-4 and hydrosiloxane in a ratio of 3:1 were added together with 4 kg of red-orange pigment.

The finished printing composition was thoroughly stirred and used for printing on fabrics of natural and synthetic fibers on printing machines using conventional techniques. Printed fabrics were dried at 90°-110° C. and heat-treated at 150°-170° C. for 3-5 minutes.

EXAMPLE 6

40 l of cold water were poured into a tank, and then 1.5 kg of granular thickener comprising a copolymer of butyl acrylate and methacrylic acid cross-linked with 0.8% by weight of ethylene glycol dimethyacrylate and neutralized with diethylamine during the synthesis were added under continuous stirring. After a viscous homogeneous mass had been obtained, 33 l of cold water were added together with 18 kg of a 50% dispersion of a copolymer of butyl acrylate, styrene, N-methylol methacrylamide and methacrylic acid in a ratio of 87:14:4.5:5.5. After stirring, 1.5 kg of a mixture of 1-aminohexene-5 and hydrosiloxane in a ratio of 3:1, 2 kg of glycerin and 4 kg of phthalocyanine blue pigment were added to the system.

The finished printing composition was thoroughly stirred and used for printing on fabrics of natural and synthetic fibers on printing machines using conventional techniques. Printed fabrics were dried at 90°-110° C. and heat-treated at 150°-170° C. for 3-5 minutes.

EXAMPLE 7

40 l of cold water were poured into a tank, and then 1.5 kg of granular thickener comprising a copolymer of butyl acrylate and methacrylic acid, cross-linked with 0.8% by weight of ethylene glycol dimethacrylate and neutralized with N-propylamine during the synthesis were added gradually under continuous stirring. After a viscous homogeneous mass had been obtained, 35 l were added together with 18 kg of a 50% dispersion of a copolymer of butyl acrylate, styrene, N-methylol methacrylamide and methacrylic acid in a ratio of 78:14:4.5:5.5. After stirring, 1.5 kg of a mixture of alkylamine with ethylhydrosiloxane in a ratio 3:1 and 4 kg of red pigment were added to the system.

The finished printing composition was thoroughly stirred and used for printing on fabrics of natural and synthetic fibers on printing machines using conventional techniques. Printed fabrics were dried at 90°-110° C. and heat-treated at 150°-170° C. for 3-5 min.

EXAMPLE 8

40 l of cold water were poured into a tank, and then 1.5 kg of granular thickener comprising a copolymer of butyl acrylate and methacrylic acid, cross-linked with 0.8% by weight of ethylene glycol dimethacrylate and neutralized with isopropylamine during the synthesis were added gradually under continuous stirring. After a viscous homogeneous mass had been obtained, 35 l of cold water were added together with 18 kg of a 50% dispersion of a copolymer of butyl acrylate, styrene, N-methylol methacrylamide and methacrylic acid in a ratio of 78:14:4.5:5.5. After stirring, 1.5 kg of a mixture of allylamine with ethylhydrosiloxane in a ratio 3:1 and 4 kg of brown pigment were added to the system.

The finished printing composition was thoroughly stirred and used for printing on fabrics of natural and synthetic fibers on printing machines using conventional techniques. Printed fabrics were dried at 90°-110° C. and heat-treated at 150°-170° C. for 3-5 min.

EXAMPLE 9

47 l of cold water were poured into a tank, and then 1 kg of granular thickener comprising a copolymer of ethyl acrylate and acrylic acid, cross-linked with 0.8% by weight of ethylene glycol dimethacrylate and neutralized with ethylamine during the synthesis were added gradually under continuous stirring. After a viscous homogeneous mass had been obtained, 40 l of cold water were added together with 10 kg of a 50% dispersion of a copolymer of butyl acrylate, styrene, N-methylol and methacrylamide and methacrylic acid in a ratio of 78:14.4.5:5.5. After stirring, 1 kg of a mixture of allylamine with hydrosiloxane in a ratio 5:1 and 1 kg of pigment phthalocyanine green were added to the system. The finished printing composition was thoroughly stirred and used for printing on fabrics of natural and synthetic fibers on printing machines using conventional techniques. Printed fabrics were dried at 90°-110° C. and heat-treated at 150°-170° C. for 3-5 min.

EXAMPLE 10

33 l of cold water were poured into a tank, and then 2 kg of granular thickener comprising a copolymer of 2-ethyl-hexyl acrylate and methacrylic acid, cross-linked with 0.8% by weight of ethylene glycol dimethyacrylate neutralized with N-propylamine during the synthesis were added gradually under continuous stirring. After a viscous homogeneous mass had been obtained, 30 l of cold water were added together with 25 kg of a dispersion of a copolymer of butyl acrylate, styrene, N-methylol methacrylamide and methacrylic acid in a ratio of 78:14:4.5:5.5. After stirring, 2 kg of a mixture of allylamine with hydrosiloxane in a ratio 1:1 and 8 kg of pigment phtholocyamine blue were added to the mixture. The finished printing composition was thoroughly stirred and then used for printing on fabrics of natural and synthetic fibers on printing machines using conventional techniques. Printed fabrics were dried at 90°-110° C. and heat-treated at 150°-170° C. for 3-5 min.

What is claimed is:

1. A composition for printing on fabrics of natural and synthetic fibers, containing a pigment, an acrylic film-forming agent comprising a copolymer of butyl acrylate, styrene, N-methylol methacrylamide and methacrylic acid, a softener comprising a mixture of unsaturated primary aliphatic amines ($C_3$-$C_6$) and hydrosiloxane, a synthetic acrylic thickener in the form of a copolymer of alkyl acrylate ($C_2$-$C_8$) and α-unsaturated acid containing from 0.5 to 1.0% by weight of ethylene glycol dimethacrylate neutralized with diethyl amine, and water, the components being used in the following proportions (in % by weight):

| | |
|---|---|
| pigment | 1.0-8.0 |
| acrylic film-forming agent | 10.0-25.0 |
| synthetic acrylic thickener | 1.0-2.0 |
| mixture of unsaturated primary aliphatic amine ($C_3$-$C_6$) with hydrosiloxane in a weight ratio from 5:1 to 1:1, respectively | 1.0-2.0 |
| water | 87-63. |

2. A composition according to claim 1, containing glycerin in an amount from 1 to 2% by weight.

* * * * *